No. 778,303. PATENTED DEC. 27, 1904.
C. G. CARLSON & W. A. MAYR.
CURTAIN STRETCHER.
APPLICATION FILED JUNE 3, 1901.
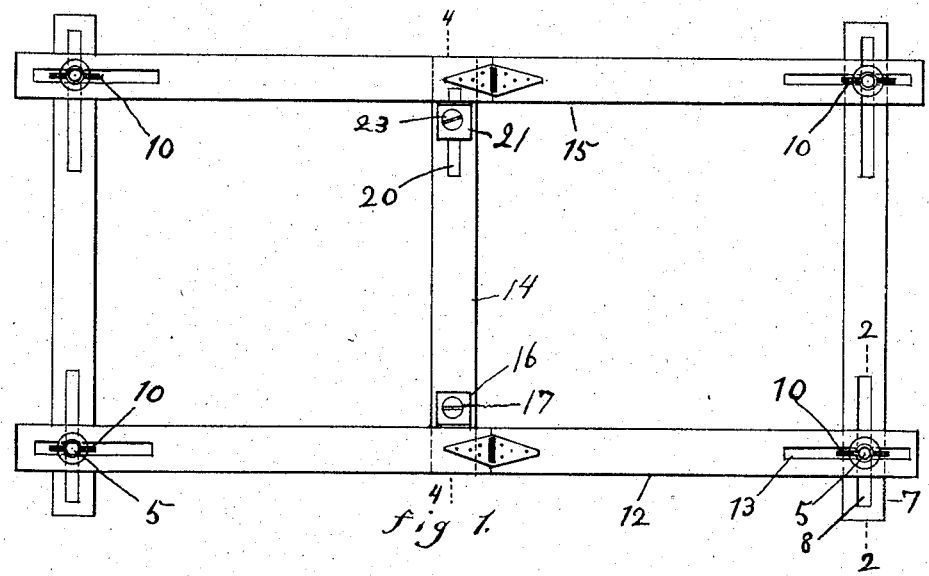
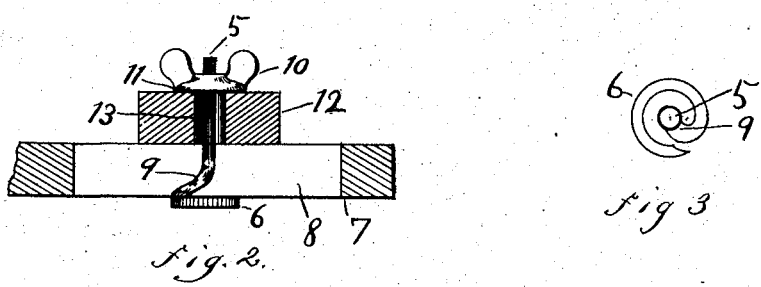
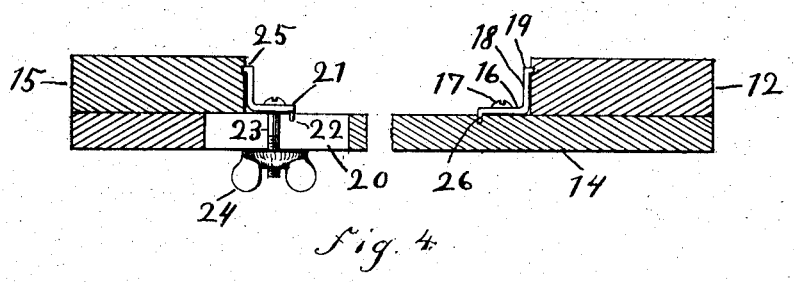

No. 778,303. Patented December 27, 1904.

UNITED STATES PATENT OFFICE.

CHARLES G. CARLSON AND WALTER A. MAYR, OF CHICAGO, ILLINOIS, ASSIGNORS TO CHICAGO CURTAIN STRETCHER CO., OF CHICAGO, ILLINOIS.

CURTAIN-STRETCHER.

SPECIFICATION forming part of Letters Patent No. 778,303, dated December 27, 1904.

Application filed June 3, 1901. Serial No. 62,943.

*To all whom it may concern:*

Be it known that we, CHARLES G. CARLSON and WALTER A. MAYR, citizens of the United States, residing at Chicago, in the county of Cook and State of Illinois, have invented a new and useful Curtain-Stretcher, of which the following is a specification.

Our invention relates to curtain-stretchers, and has for its object to provide a simple clamping device for the corners which can be manufactured at a low cost and can be quickly applied, and, second, to provide simple and efficient mechanism for bracing the center of the side bars. We attain these objects by the construction illustrated in the accompanying drawings, in which—

Figure 1 is a plan view of a curtain-stretcher with our improvements applied thereto. Fig. 2 is a section on the line 2 2 of Fig. 1. Fig. 3 is a plan view of the clamping-bolt, and Fig. 4 is a section on the line 4 4 of Fig. 1.

In the accompanying drawings similar numerals of reference refer to like parts in each of the views, and in the practice of our invention we provide a curtain-stretcher the bars of which are slotted adjacent to the ends thereof, as shown in Fig. 1, with a clamping device comprising a bolt 5, formed out of heavy wire, which is bent at one end to form a large curved head 6, which is proportioned in size to overlap a considerable portion of the bar 7 on each side of the slot 8. The wire is also preferably bent upwardly and inwardly from the perimeter of the base to a point above the center thereof, forming thereby an inclined part 9, and is then bent upwardly substantially perpendicular to the base. We also provide a thumb-nut 10, having an extended base 11, adapted to overlap a considerable portion of the bar 12 on each side of the slot 13, as clearly shown in Fig. 2.

In operation the bolt 5 is inserted in the slots 8 and 13, which are proportioned in width, so that the bolt 5 will move freely therein, but will prevent the part 9 describing a curve, so that when the thumb-nut is being secured in place the bolt cannot turn completely around and the thumb-nut can be tightened without having to hold the bolt except to keep the part 9 up in the slot. This device is much more effective than a bolt with a square shoulder adjacent to the head would be, as the slot must be of sufficient size to permit of the free passage of the bolt when the parts are not clamped together, and an ordinary bolt would have to have a projection on one side thereof in order to prevent the turning of the bolt, as the part 9 prevents it.

By making the base 6 of the bolt and the base 11 of the nut large enough to overlap a considerable portion of the respective bars no washers are required. This feature is also very important, as a washer could not well be used on the bolt, and washers are not desirable in any event on account of liability to lose the same in storing the bars and on account of adding to the loose parts when adjusting the bars.

We also provide a brace for the center of the curtain-stretcher, in order to hold the side bars from sagging toward each other when a number of curtains are stretched in position, and with this end in view we provide a bar 14, provided with a stationary plate 16, secured thereto by a screw 17, so that it may be secured at any desired point, and the plate 16 is provided with an upwardly-projecting portion 18, ending with an angled portion 19, adapted to be pressed slightly into the wood of the bar 12, as clearly shown in Fig. 4. The opposite end of the bar 14 is slotted, as shown at 20, and over this slotted portion we mount a plate 21, having a depending portion 22 adapted to move in said slot, and a bolt 23 and thumb-nut 24 serve to clamp the plate 21 at any point along the slot 20. The plate 21 is otherwise similar to the plate 16 and is provided with an angled part 25, which may be pressed into the wood of the bar 15, thus making a positive engagement therewith.

In operation the plate 16 is forced against the bar 12 and the plate 21 is pressed against the bar 15. Then the thumb-nut 24 is turned up tight to clamp the plate in place, and the two bars of the curtain-stretcher will be firmly braced apart, as will be readily understood. It will be observed that the thumb-nut 24 is provided with the same kind of a base as the thumb-nuts 10, so that no washer is required. we may also provide the plate 16 with a prong 26, which may be pressed into the bar 14 to aid the screw 17 in holding the plate in place.

By reason of the plate 21 being adjustably mounted on the bar 14 the brace can be quickly adjusted to any desired width between the bars, and it is of course understood that the plates 16 and 21 would vary in shape in accordance with the kind of bar used in the curtain-stretcher, so that if the bars of the curtain-stretcher had rabbeted edges the upright part of the plates would be less in height.

Having thus described our invention, what we claim as new, and desire to secure by Letters Patent, is—

1. A clamping-bolt formed of wire curved to form the head of the bolt and projecting upward obliquely from the perimeter of said head, and then substantially perpendicular to the center of said head.

2. In a curtain-stretcher having slotted ends, a clamping-bolt formed of wire curved to form the head of the bolt and projecting upward obliquely from the perimeter of said head, and then substantially perpendicular to said head, as and for the purpose set forth.

In testimony whereof we have signed our names to this specification in the presence of two subscribing witnesses.

CHARLES G. CARLSON.
WALTER A. MAYR.

Witnesses:
ALBIN HALQUEST,
JOHN E. YOUNGDAHL.